United States Patent
Jugel

(10) Patent No.: US 9,898,842 B2
(45) Date of Patent: Feb. 20, 2018

(54) METHOD AND SYSTEM FOR GENERATING DATA-EFFICIENT 2D PLOTS

(71) Applicant: Uwe Jugel, Dresden (DE)

(72) Inventor: Uwe Jugel, Dresden (DE)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 14/635,787

(22) Filed: Mar. 2, 2015

(65) Prior Publication Data

US 2016/0260233 A1  Sep. 8, 2016

(51) Int. Cl.
*G06T 11/20* (2006.01)
*G06T 15/40* (2011.01)

(52) U.S. Cl.
CPC .......... *G06T 11/206* (2013.01); *G06T 15/405* (2013.01)

(58) Field of Classification Search
CPC .............................. G06T 11/206; G06T 15/405
See application file for complete search history.

(56) References Cited

U.S. PATENT DOCUMENTS

| 6,058,209 | A  | * | 5/2000 | Vaidyanathan | .... | G06K 9/00127 |
| | | | | | | 382/133 |
| 6,239,809 | B1 | * | 5/2001 | Morioka | ................. | G06T 15/40 |
| | | | | | | 345/422 |
| 6,473,082 | B1 | * | 10/2002 | Hong | .................... | G06T 15/405 |
| | | | | | | 345/422 |
| 7,342,594 | B1 | * | 3/2008 | Ort | ........................ | G06F 9/4443 |
| | | | | | | 345/530 |
| 8,659,621 | B1 | * | 2/2014 | Stiglitz | ................... | G06T 19/20 |
| | | | | | | 345/619 |
| 2004/0189711 | A1 | * | 9/2004 | Misawa | ................ | G06F 3/0481 |
| | | | | | | 715/790 |
| 2008/0043132 | A1 | * | 2/2008 | Gunter | ................... | H04N 5/232 |
| | | | | | | 348/333.01 |
| 2008/0094395 | A1 | * | 4/2008 | Woo | ...................... | G06T 15/405 |
| | | | | | | 345/422 |
| 2008/0123993 | A1 | * | 5/2008 | Widdowson | ............ | G06T 11/60 |
| | | | | | | 382/284 |
| 2010/0107101 | A1 | * | 4/2010 | Shaw | .................... | G06F 3/0481 |
| | | | | | | 715/766 |

(Continued)

OTHER PUBLICATIONS

Google Developers, "Visualization Bubble Chart", retrieved from https://developers.google.com/chart/interactive/docs/gallery/bubblechart on Feb. 11, 2015, 18 pages.

*Primary Examiner* — Kee M Tung
*Assistant Examiner* — Grace Q Li
(74) *Attorney, Agent, or Firm* — Brake Hughes Bellermann LLP

(57) ABSTRACT

In one aspect, a method can include a computing system receiving data for rendering as a plurality of objects in a chart, and rendering the plurality of objects in a first order in a first graph in a virtual display. The method can include swapping a first object and a second object in the first order of the plurality of objects creating a second order of the plurality of objects, rendering the objects in a second graph in the virtual display based on the second order, determining that a number of visible objects in the first graph is less than a number of visible objects in the second graph, and outputting the second order of the plurality of objects for rendering on a display device based on determining that a number of visible objects in the first graph is less than a number of visible objects in the second graph.

20 Claims, 7 Drawing Sheets

(56) References Cited

U.S. PATENT DOCUMENTS

| | | | | |
|---|---|---|---|---|
| 2013/0050256 A1* | 2/2013 | Hirota | ............... | G06F 3/0481 |
| | | | | 345/629 |
| 2014/0245194 A1* | 8/2014 | Wright | ............... | G06F 9/4445 |
| | | | | 715/761 |
| 2015/0200979 A1* | 7/2015 | Huang | ............... | G06F 3/0483 |
| | | | | 715/753 |

* cited by examiner

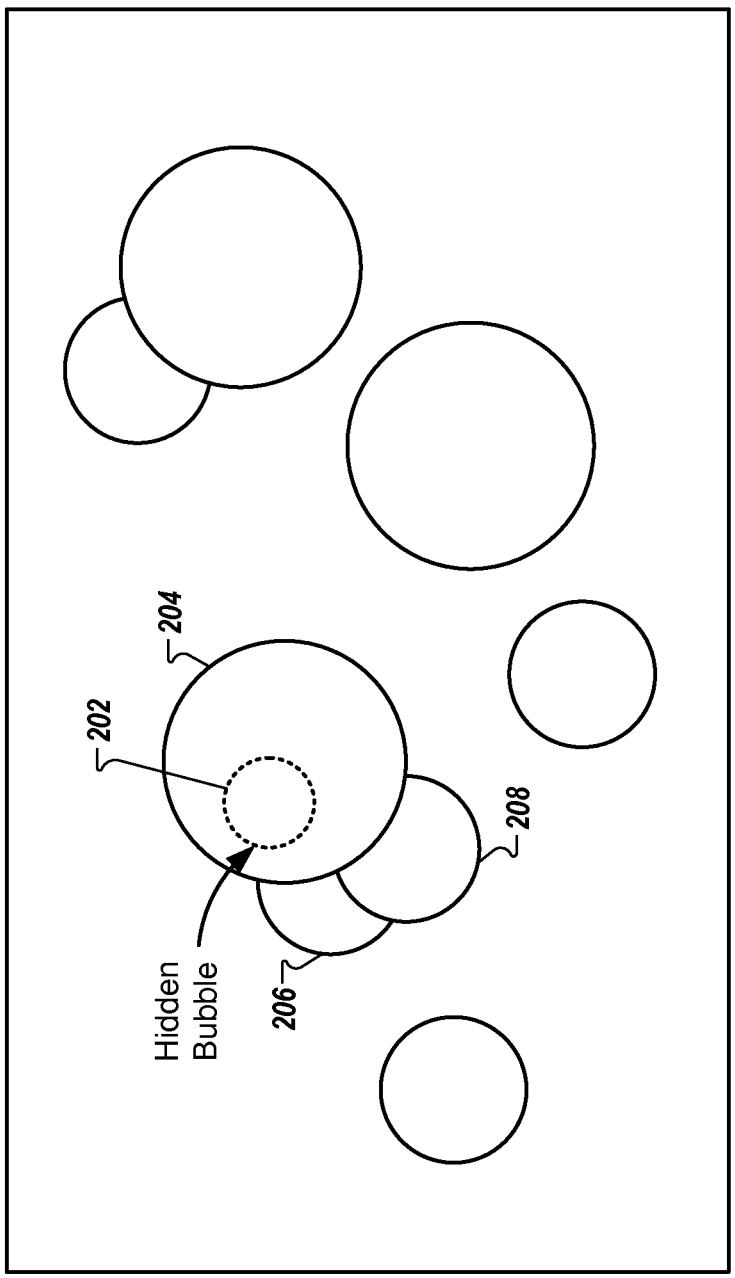

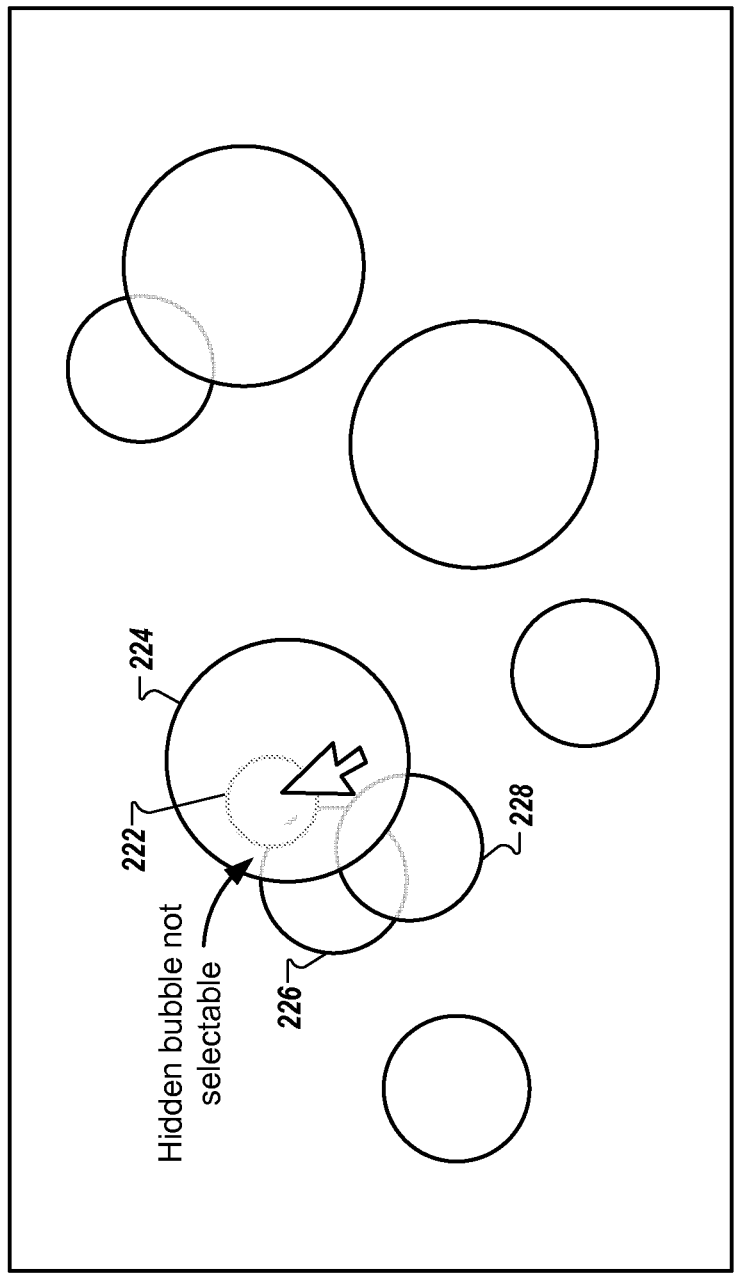

METHOD AND SYSTEM FOR GENERATING DATA-EFFICIENT 2D PLOTS

TECHNICAL FIELD

This description generally relates to the use of two-dimensional (2D) plots or graphs of data.

BACKGROUND

There are many different types of graphs and charts that a user can use to visually represent multiple dimensional data (e.g., two, three, or four dimensions of data). For example, a scatter plot or scattergraph can display two-dimensional data in an x-y coordinate system. Each data entry can be represented as a point in the x-y coordinate system. Each data entry can include a value of a variable that determines a position of the point on the horizontal or x-axis and a value of a variable that determines a position of the point on the vertical or y-axis. In another example, a bubble chart can display three-dimensional data in an x-y coordinate system. Each data entry can include values for each of three variables. A first variable can be a position of a point on the horizontal or x-axis. A second variable can be a position of the point on the vertical or y-axis. A third variable can represent a size of the point (e.g., the point can be represented by a circle or bubble).

Scatter plots and bubble charts can provide 2D and three-dimensional (3D), respectively, representations of groups or sets of related data. For example, a bubble chart can display a plot of a quantity of items sold (represented by the size of the bubble), sold at a point in time (a dimension on an x-axis) at a particular price (a dimension on a y-axis). In some cases, the bubbles plotted on a bubble chart may intersect and/or overlap one or more other bubbles. This may cause the view of some data included in the bubble chart to be obstructed.

SUMMARY

In one general aspect, a method can include receiving, by a computing system, data for rendering as a plurality of objects in a chart, rendering the plurality of objects in a first order in a first graph in a virtual display, swapping a first object and a second object in the first order of the plurality of objects creating a second order of the plurality of objects, rendering the objects in a second graph in the virtual display based on the second order, determining that a number of visible objects in the first graph is less than a number of visible objects in the second graph, and outputting the second order of the plurality of objects for rendering on a display device based on determining that a number of visible objects in the first graph is less than a number of visible objects in the second graph.

Implementations may include one or more of the following features. For instance, the objects can be three-dimensional objects. The objects can be graphics primitives. The objects can be circles. The first graph can be a first bubble graph, and the second graph can be a second bubble graph. The method can further include sorting the objects into the first order based on at least one criterion associated with each of the plurality of objects. The at least one criterion associated with each of the plurality of objects can be a size. Sorting the objects into the first order can include sorting the objects into an order from a smallest size object to a largest size object. The method can further include updating entries in a Z-Buffer, each entry associated with a respective each of the plurality of objects, the updating being after a rendering of the objects in the first graph. The information about each pixel displayed in the virtual display and stored in the Z-Buffer can include an indication of the object associated with the pixel and an order for rendering the shape corresponding to the pixel. Outputting the second order of the plurality of objects for rendering on a display device can be further based on determining that at least one criterion has been satisfied. The at least one criterion can be one of determining that a predetermined number of iterations of data swapping has been satisfied, and determining that a predetermined time period has expired. The method can further include, based on determining that a number of visible objects in the first graph is equal to or greater than a number of visible objects in the second graph, restoring the first order of the objects. The method can further include swapping a third object and a fourth object in the second order of the plurality of objects creating a third order of the plurality of objects based on determining that at least one criterion has not been satisfied.

In another general aspect, a computer system can include a visualization preprocessing system configured to receive data for rendering as a plurality of objects in a chart. The visualization preprocessing system can include a virtual display, a Z-order optimizer configured to sort the objects into a first order, and configured to swap a pair of objects included in the first order of sorted objects to create a second order of the plurality of objects, and an optimizer rendering system configured to render the objects in a first graph in the virtual display based on the first order, render the objects in a second graph in the virtual display based on the second order, and determine that a number of visible objects in the first graph is less than a number of visible objects in the second graph. The computer system can further include a rendering system configured to receive the plurality of objects in the second order from the visualization preprocessing system, and configured to output the plurality of objects for rendering on a display device in an order specified by the second order based on determining that a number of visible objects in the first graph is less than a number of visible objects in the second graph.

Implementations may include one or more of the following features. For instance, the Z-order optimizer can be further configured to sort the objects into a first order based on at least one criterion associated with each of the plurality of objects. The at least one criterion associated with each of the plurality of objects can be a size. The plurality of objects included in the first order can be in an order from a smallest size object to a largest size object. The system can further include a Z-Buffer including a plurality of entries, each entry associated with a respective pixel included in the virtual display, each entry including an indication of an object associated with the pixel and an order for rendering the shape corresponding to the pixel. The Z-order optimizer can be configured to continue to swap a pair of objects included in an order of sorted objects until at least one criterion has been satisfied.

In yet another general aspect, a non-transitory, machine-readable medium having instructions stored thereon, the instructions, when executed by a processor, can cause a computing device to receive data for rendering as a plurality of objects in a chart, render the objects in a first graph in a virtual display based on the first order, swap a first object and a second object in the first order of the plurality of objects creating a second order of the plurality of objects, render the objects in a second graph in the virtual display based on the second order, determine that a number of visible objects in the first graph is less than a number of visible objects in the second graph, and output the second order of the plurality of objects for rendering on a display device based on determining that a number of visible objects in the first graph is less than a number of visible objects in the second graph.

Implementations may include one or more of the following features. For instance, the instructions can further cause the computing device to update entries in a Z-Buffer. Each entry can be associated with a respective each of the plurality of objects. The updating can be after the rendering of the objects in the first graph. The instructions can further cause the computing device to display a plurality of pixels in the virtual display. The instructions can further cause the computing device to store, in the Z-Buffer, information about each pixel displayed in the virtual display.

The details of one or more implementations are set forth in the accompanying drawings and the description below. Other features will be apparent from the description and drawings, and from the claims.

BRIEF DESCRIPTION OF THE DRAWINGS

FIG. 2A is a diagram showing an example bubble chart where a second bubble is hidden behind a first bubble.

FIG. 2B is a diagram showing an example interactive, transparent bubble chart where a second bubble is viewable behind a first bubble because the bubbles are displayed transparently.

Like reference symbols in the various drawings indicate like elements.

DETAILED DESCRIPTION

Figure 1A:
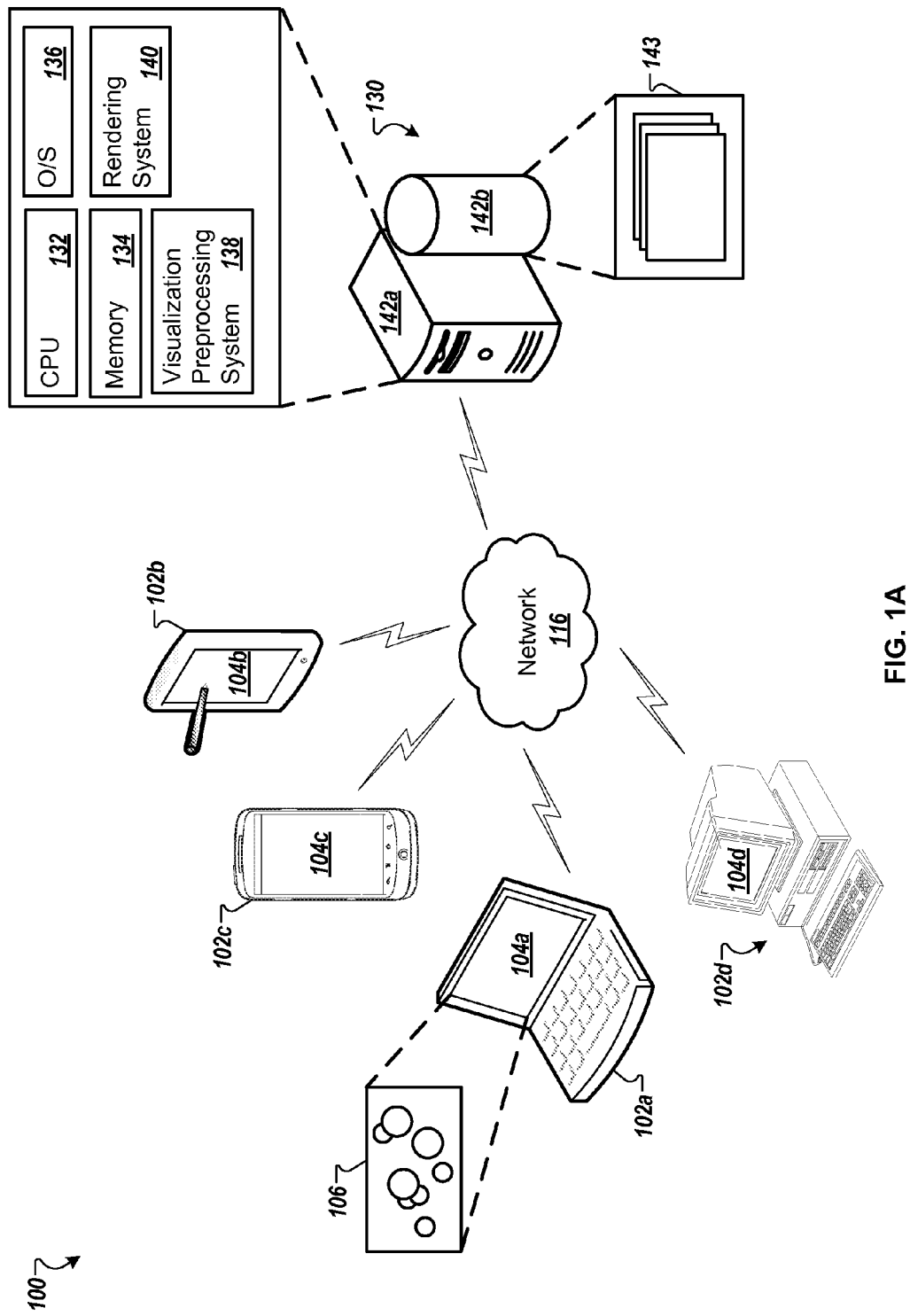
FIG. 1A is a diagram of an example system that includes a visualization preprocessing system and a rendering system installed on a computer system.

Data rendered in a chart can use two-dimensional (2D) graphics primitives to represent multi-dimensional data. For example, a circle in a bubble chart can be considered a 2D graphics primitive. The 2D graphics primitive can be positioned in a 2D space. For example, the 2D space can be determined by an x axis and a y axis of a 2D chart. A graphics primitive (e.g., a circle) can be placed at an x-y coordinate in the 2D chart, the graphics primitive now being a 2D graphics primitive representing data in the x/y coordinate space. In some implementations, the 2D graphics primitive can vary in size in a third-dimension. The size variation can represent additional data in a third dimension. In some implementations, the 2D graphics primitive can vary in color, the color of the 2D graphics primitive representing additional data in a third dimension. In some implementations, the 2D graphics primitive can vary in size and in color, representative of data in a third dimension and a fourth dimension, respectively. For example, a chart that includes an x-axis and a y-axis can have a circle of a particular size and color located at an x/y coordinate on the chart, the circle representing four dimensions of data.

For example, the chart can be a bubble chart and a graphics primitive can be a bubble where a location of the bubble in an x-y coordinate space can represent two data variables or dimensions for an item (e.g., time of sale and price or cost) and a size of the bubble can represent a third data variable or dimension (e.g., volume or number of items sold). In some cases, one graphics primitive may intersect with or overlap another graphics primitive. In these cases, one or more graphics primitives may overlap or hide one or more other graphics primitives. A user may not see some of the data plotted by the graphics primitives on the chart.

The obstruction of some or all of a view of a graphics primitive by another graphics primitive can occur based on an order in which the graphics primitives are plotted on the chart. For example, a second graphics primitive whose center is close to a first graphics primitive that was previously plotted on the chart may be of a size that is large enough to partially or, in some cases, totally obscure the view of the first graphics primitive. In this case, a user would have no indication that the first graphics primitive was included in the chart. The user would not gain insight into the data represented by the first graphics primitive.

The user, when viewing the chart, needs to view graphic primitive representations of all of the data provided for charting. The smaller the number of hidden or obscured graphics primitives or the higher the number of visible graphics primitives, the higher the data efficiency of the chart. The rendering order of the graphics primitives can affect (determine) the number of obscured or hidden objects. A system and method can presort the data for plotting on a graph to adjust a rendering order for the graphics primitives that represent the data to reveal as many objects as possible (to obscure or hide as few objects as possible).

FIG. 1A is a diagram of an example system 100 that includes a visualization preprocessing system 138 and a rendering system 140 installed on a computer system 130. The example system 100 includes computing devices 102a-d. A user can connect to or otherwise interface with the computer system 130 by way of a network 116 using one or more of the computing devices 102a-d. For example, a computing device 102a can be a mobile phone, a smartphone, a personal digital assistant, or other type of mobile computing device. The computing device 102a includes a display device 104a. For example, a computing device 102b can be a laptop or notebook computer. The computing device 102b includes a display device 104b. For example, a computing device 102c can be a tablet computer. The computing device 102c includes a display device 104c. For example, a computing device 102d can be a desktop computer. The computing device 102d includes a display device 104d. A user of the computing devices 102a-d can use/interface with the display devices 104a-d, respectively, when viewing a graph of data points.

In some implementations, the network 116 can be a public communications network (e.g., the Internet, cellular data network, dialup modems over a telephone network) or a private communications network (e.g., private LAN, leased lines). In some implementations, the computing devices 102a-d can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The computer system 130 can include one or more computing devices (e.g., a server 142a) and one or more computer-readable storage devices (e.g., a database or repository 142b). The database 142b can include data records 143. The server 142a can include one or more processors (e.g., server CPU 132), and one or more memory devices (e.g., server memory 134). The computing devices 102a-d can communicate with the computer system 130 (and the computer system 130 can communicate with the computing devices 102a-d using the network 116. The server 142a can execute a server O/S 136, and one or more applications included in the visualization preprocessing system 138 and the rendering system 140. In some implementations, the computer system 130 can represent multiple computing devices (e.g., servers) and multiple computer-readable storage devices (e.g., databases) working together to perform server-side operations.

A database 142b includes records for data points for sorting. For example, the records can include sales data for multiple products or items that can include, but is not limited to, a time of sale for an item, a price or cost for an item, and a number or amount of the item sold. The visualization preprocessing system 138 can receive data from the database 142b and sort the data for rendering or plotting in a graph (e.g., a bubble graph). The visualization preprocessing system 138 provides the sorted data to the rendering system 140. The rendering system 140 can render the sorted data for display in a graph (e.g., a bubble graph). The rendering system 140 can transmit the rendered graph to one or more of the computing devices 102a-d by way of the network 116 for display on a respective display device 104a-d. For example, the rendering system 140 can transmit the rendered graph to the computing device 102a for display on the display device 104a as a bubble graph 106.

In some implementations, the visualization preprocessing system 138 and the rendering system 140 may be included in a computing device remote from the computer system 130 (e.g., the computing devices 102a-d). The visualization preprocessing system 138 and the rendering system 140 can function as described providing and rendering the data points for display on a display device (e.g., the display devices 104a-d) included in a respective computing device (e.g., the computing devices 102a-d). In these implementations, the computing device (e.g., the computing devices 102a-d) can access the data for rendering as data points in a graph from the database (repository) 142b by way of the network 116.

In some implementations, the visualization preprocessing system 138 may be included in the computer system 130 and the rendering system 140 may be included in a computing device remote from the computer system 130 (e.g., one or more of the computing devices 102a-d). The visualization preprocessing system 138 and the rendering system 140 can function as described providing and rendering the data points for display on a display device (e.g., the display devices 104a-d) included in the computing device (e.g., the computing devices 102a-d) that includes the rendering system 140. In these implementations, the computing device (e.g., the computing devices 102a-d) can receive sorted data from the computer system 130 by way of the network 116.

In some implementations, the visualization preprocessing system 138 may apply size-based sorting before the rendering system 140 renders graphics primitives. Size-based sorting can render graphics primitives based on the attribute of the data (the variable) that determines the size of the graphics primitive. Size-based sorting can order the graphics primitives for rendering such that the larger the graphics primitive the earlier it will be rendered and the smaller the graphics primitive the later it will be rendered. Using size-based sorting, larger graphics primitives are pushed to the back or rear of the rendering order while the smaller graphics primitives are delegated to the top or front of the rendering order.

When performing size-based sorting, however, there may be one or more data points that can be included in a graphics primitive where the graphics primitive may be completely hidden from view due to the placement of the rendering of the graphics primitives relative to one another. For example, multiple smaller graphics primitives can overlay a larger graphics primitive, completely obscuring (hiding) the larger graphics primitive from view. An example of this is shown with reference to FIG. 2C.

In some implementations, the visualization preprocessing system 138 may sort the data for rendering based on one or more criteria. For example, the data may be sorted based on an order in which the data is received by the computer system 130. In another example, the data may be sorted based on an order in which the data is stored in the database 142b. In another example, the data may be sorted based on a time associated with each data entry. In some implementations, the visualization preprocessing system 138 may not apply any type of data sorting before the rendering system 140 renders graphics primitives.

In order to unhide (bring into view) a first graphics primitive, the first graphics primitive can be moved up in the relative sorting order of the graphics primitives so that the first graphics primitive may become visible while not completely obscuring (covering or hiding) any of the already visible graphics primitives. Moving the first graphics primitive up in the relative sorting order of the graphics primitives implies that a second graphics primitive will move down in the relative sorting order. The movement of the first graphics primitive and the second graphics primitive in the relative sorting order can be considered a swapping of two data points (data representations) on a chart. The two data points can be swapped in the original sorted order of data points or representations and are swapped according to a rendering order (e.g., an implicit z-axis order).

In some implementations, the visualization preprocessing system 138 can generate a first relative sorting order for a plurality of data points for plotting on a chart (e.g., a bubble chart). The visualization preprocessing system 138 can provide the ordered data points to the rendering system 140. The rendering system 140 can plot the data points in the first relative order in a first graph (e.g., create a first bubble graph). The visualization preprocessing system 138 can identify a data-efficiency measure for the first graph (e.g., how many data points are hidden or obscured from view in the graph). The visualization preprocessing system 138 can associate the data-efficiency measure for the first graph with the first relative sorting order for the plurality of data points. The visualization preprocessing system 138 can then selectively swap one or more data points in the first relative sorting order to generate a second relative sorting order. The swapped data points can include one or more of the identified hidden or obscured data points in an attempt to unhide or bring into view the hidden data points. The rendering system 140 can plot the data points in the second relative order in a second graph (e.g., create a second bubble graph) and identify a data-efficiency measure for the second graph (e.g., how many data points are hidden or obscured from view in the graph). The visualization preprocessing system 138 can associate the data-efficiency measure for the second graph with the second relative sorting order for the plurality of data points. The visualization preprocessing system 138 can determine if the data-efficiency measure for the second graph is an improvement over (better than, increased as compared to) the data-efficiency measure for the first graph.

If the data-efficiency measure for the second graph is an improvement over the data-efficiency measure for the first graph, the visualization preprocessing system 138 will maintain the second relative sorting order. The system 100 can iteratively identify a data-efficiency measure for a graph, and associate the identified data-efficiency measure for the graph with the relative sorting order for the plurality of data points used to create the graph. The visualization preprocessing system 138 can continue to selectively swap one or more data points in the relative sorting order to generate another relative sorting order until a data-efficiency measure for a current graph is not an improvement over (not better than, decreased as compared to) the data-efficiency for the previous graph. When this occurs, the system 100 will revert to the previous graph and relative sorting order for the data points used to generate the previous graph. The system 100 can effectively undo the previous swapping of the data points.

In some implementations, the visualization preprocessing system 138 can swap data points for a predetermined number of times (e.g., n times, where n is the number of data points included in the data set). The rendering system 140 can plot the data points in a first relative order in a first graph (e.g., create a first bubble graph). The visualization preprocessing system 138 can identify a data-efficiency measure for the first graph (e.g., how many data points are hidden or obscured from view in the graph). The visualization preprocessing system 138 can associate the data-efficiency measure for the first graph with the first relative sorting order for the plurality of data points. The visualization preprocessing system 138 can swap data points. The rendering system 140 can then plot the data points in the second relative order in a second graph (e.g., create a second bubble graph). The visualization preprocessing system 138 can identify a data-efficiency measure for the second graph (e.g., how many data points are hidden or obscured from view in the graph). The visualization preprocessing system 138 can associate the data-efficiency measure for the second graph with the second relative sorting order for the plurality of data points. The system 100 can continue to swap data points, plot swapped data point in another relative order, and identify data efficiency measures. Once n pairs of points are swapped, the system 100 can determine the most efficient plotting of the data points (the highest data-efficiency measure) and use the relative order of the data points associated with the highest data-efficiency measure for plotting in a graph (e.g., a bubble graph). The graph can have the least number (if any) of hidden or obscured data points.

In some implementations, the system 100 may continue to swap points until the data-efficiency measure for a current graph meets or exceed a particular value or criterion. For example, if the data-efficiency for a current graph is greater than ninety percent (ninety percent of all of the data points being plotted are not hidden or obscured from view), the system 100 may stop swapping points and use the current graph for displaying the data points to a user.

Figure 1B:
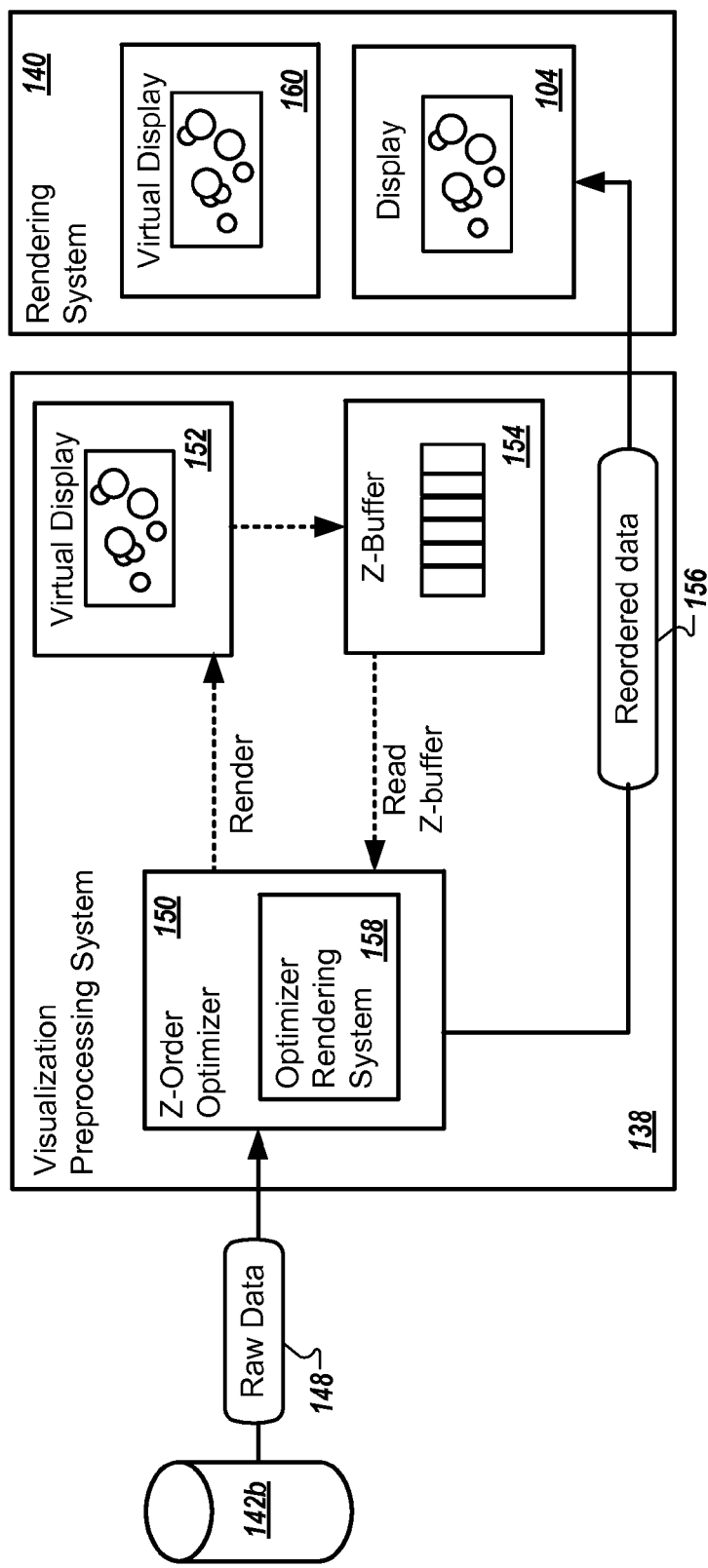
FIG. 1B is a block diagram showing a Z-order optimizer, a Z-Buffer, and a virtual display included in a visualization preprocessing system.

FIG. 1B is a block diagram showing a Z-order optimizer 150, a Z-Buffer 154, and a virtual display 152 included in the visualization preprocessing system 138 included in the system 100 shown in FIG. 1A.

For example, a Z-Buffer (e.g., the Z-Buffer 154) can be used to manage image depth coordinates in a 3D graphics system. The use of a Z-Buffer can provide depth information for a pixel included in a 2D image. The depth information can be used to determine a visibility of the objects (geometric primitives and their corresponding data points) in a rendered 2D image. In cases where the pixel is included in more than one object rendered on a display, the pixel will have the color or shade of the object that is considered the closest to a user viewing the object on the display. For example, when rendering a bubble graph, the pixel will have the color of the topmost bubble that includes the pixel (the last rendered bubble that includes the pixel). Given that objects can be rendered iteratively, each rendering of an object can overwrite the color or shade of all pixels included in that object. Each rendering of an object can update or overwrite the Z-Buffer values for all pixels included in that object. The rendering of an object may partially or fully overwrite the color and Z-Buffer values of one or more lower lying shapes (e.g., bubbles that are underneath the currently rendered topmost bubble). If the topmost bubble includes all pixels of an underlying bubble, the topmost bubble may hide the underlying bubble.

When creating a graph, the Z-order optimizer 150 included in the visualization preprocessing system 138 can render the graph (e.g., a bubble chart) in the virtual display 152 using an optimizer rendering system 158. The rendering can create the Z-Buffer 154, which includes an associated depth for each pixel rendered for display in the virtual display 152 (and for potential subsequent display on a display device (e.g., the display devices 104a-d)). A specific pixel included in the Z-Buffer 154 is updated when it is determined that a geometric object (e.g., a bubble in a bubble graph) being rendered for a graph includes the specific pixel.

In some implementations, the Z-Buffer 154 can store, for each pixel for rendering and display, which rendered objects (e.g., bubbles in a bubble graph) include the pixel. In some implementations, the Z-Buffer 154 can store, for a pixel for rendering and display, only the identity of the last rendered object (e.g., bubble in a bubble graph) that included the pixel. In some implementations, the Z-Buffer 154 can store, for a pixel for rendering and display, n entries (e.g., identifiers or references), where the n entries represent or reference the last n objects that included the pixel. In some implementations, the number n can be limited by a configurable or technically predefined depth of the Z-Buffer 154. In some implementations, the depth of the Z-Buffer 154 can be the same as a total number of objects (e.g., the number of bubbles in a bubble chart) that are rendered and displayed. In these implementations, the Z-Buffer 154 can maintain (store) the order in which any rendered object includes a particular pixel. The visualization preprocessing system 138 can use the maintained (stored) order included in the Z-Buffer 154 to determine which objects are hidden from view in a specific rendered 2D image. The Z-order optimizer 150 can then reorder the data to attempt to reveal (unhide) the hidden object.

In some cases, in order for the Z-order optimizer 150 to be able to perform any reordered optimizations of the data, the depth of the Z-Buffer has to be, at a minimum, equal to one. In this case, the Z-order optimizer 150 can reorder the data based on a previous entry in the Z-Buffer 154. A smaller Z-Buffer can use less memory (e.g., server memory 134) included in the computer system 130. A smaller Z-Buffer can be faster to access and manage, making the smaller Z-Buffer easier to maintain by the visualization preprocessing system 138.

In some implementations, the Z-order optimizer 150 can use the optimizer rendering system 158 to render a graph (e.g., a bubble chart) in the virtual display 152 when optimizing the display order of the data objects. In some implementations, the Z-order optimizer 150 can use the rendering system 140 to render a graph (e.g., a bubble chart) in the virtual display 152 when optimizing the display order of the data objects. In this implementation, the virtual display 152 can be created using an off-screen rendering technique (e.g., an off-screen texture).

In some implementations, the Z-order optimizer 150 can use the rendering system 140 to render a graph (e.g., a bubble chart) in the virtual display 160 when optimizing the display order of the data objects. In this implementation, the virtual display 160 can be created using an off-screen rendering technique (e.g., an off-screen texture).

FIG. 2A is a diagram showing an example bubble chart 200 where a second bubble 202 is hidden behind a first bubble 204. For illustrative purposes, the hidden bubble (the second bubble 202) is shown using a dotted line. In addition, the first bubble 204 partially obstructs the view of a third bubble 206 and a fourth bubble 208. In this example, a user viewing the bubble chart 200 on a display device (e.g., the display device 104a included in the computing device 102a as shown in FIG. 1A) will have no knowledge of the data represented by the second bubble 202 as it is hidden behind the larger first bubble 204.

FIG. 2B is a diagram showing an example interactive, transparent bubble chart 220 where a second bubble 222 is viewable behind a first bubble 224 because the bubbles are displayed transparently. An interactive bubble chart allows a user to select a bubble in order to obtain information about the data represented by the bubble (e.g., item name, sales numbers, etc.). The transparency of the chart allows a user to view objects (bubbles) that may be covered by other objects (bubbles). However, because the second bubble 222 is completely covered by/included in the first bubble 224, the second bubble 222 cannot be separately selected. In this example, a user viewing the bubble chart 200 on a display device (e.g., the display device 104a included in the computing device 102a as shown in FIG. 1A) will not be able to obtain any additional information, available through interaction with the bubble, regarding the data that is represented by the second bubble 222.

Figure 2C:
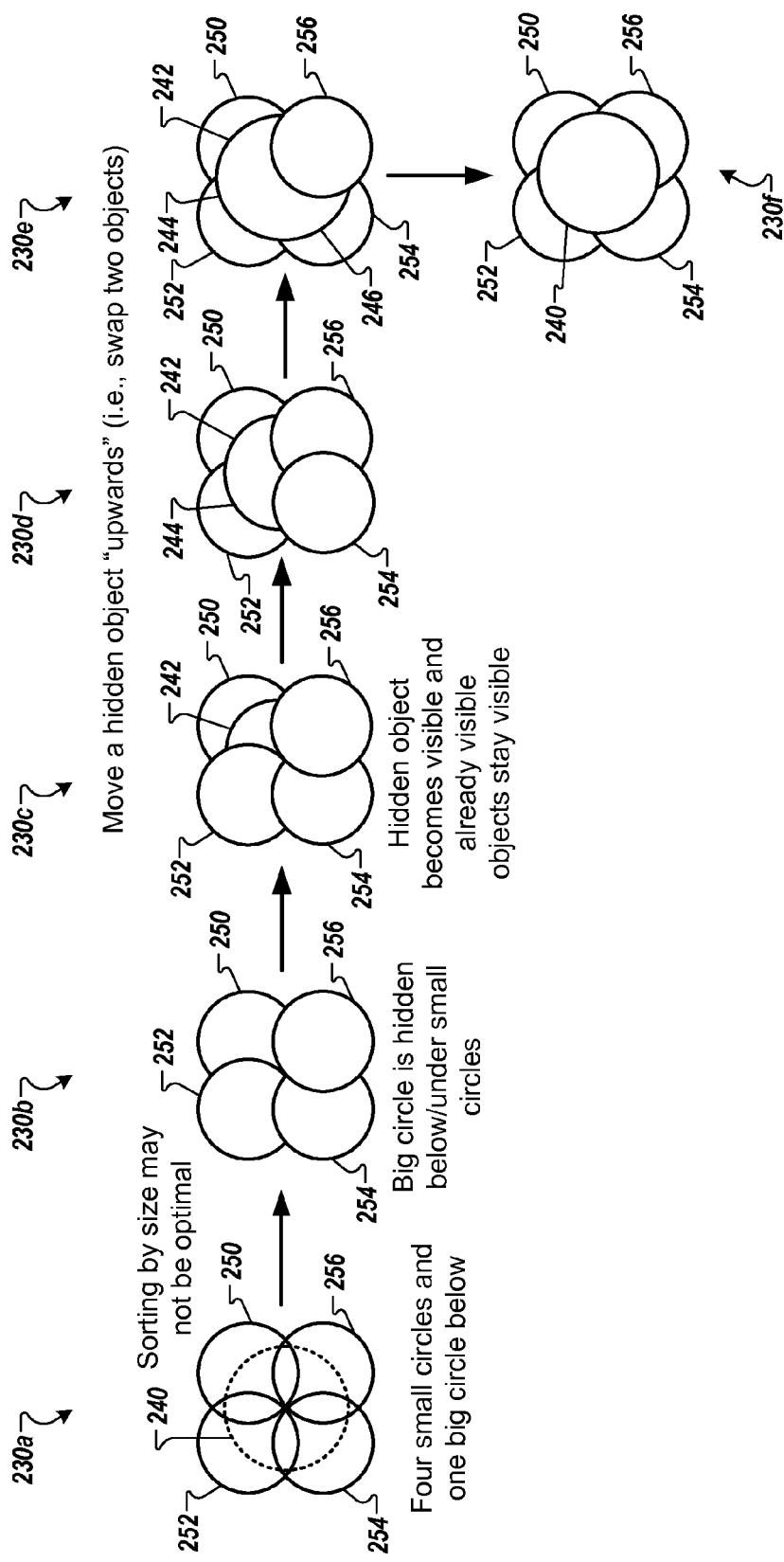
FIG. 2C is a diagram showing example views for a bubble chart.

FIG. 2C is a diagram showing an example views 230a-f for a bubble chart. The views 230a-f can be displayed to a user on a display device (e.g., the display device 104a included in the computing device 102a as shown in FIG. 1A). In the first view 230a and the second view 230b, a large circle or bubble 240 is hidden behind a view of four smaller circles or bubbles (a first circle 250, a second circle 252, a third circle 254, and a fourth circle 256). For illustrative purposes, in the first view 230a, the hidden circle or bubble (the large circle 240) is shown using a dotted line.

Using the systems and techniques described herein, referring to FIGS. 1A-B, the visualization preprocessing system 138 can apply size-based sorting before the rendering system 140 renders graphics primitives that comprise the view 230b. The use of size-based sorting can order the graphics primitives for rendering such that larger the graphics primitives are rendered earlier in the process and smaller graphics primitives are rendered later. As shown in FIG. 2C, however, multiple smaller graphics primitives can overlay a larger graphics primitive, completely obscuring (hiding) the larger graphics primitive from view.

Referring to FIG. 1B, the Z-order optimizer 150 can apply size-based sorting to the graph data, and can render the graph as a first graph rendering (e.g., the second view 230b) in the virtual display 152. The Z-Buffer 154 can include information about each pixel displayed in the virtual display 152 in the second view 230b, the object (circle or bubble) it corresponds to, and the order of rendering. The Z-order optimizer 150 can read the information and data in the Z-Buffer 154 and, based on the information, can swap two objects included in the rendered graph. For example, the Z-order optimizer 150 can swap the rendering of the first circle 250 and the large circle 240, rendering the smaller first circle 250 before the large circle 240. The Z-order optimizer 150 can render the reordered data as another graph rendering (e.g., a third view 230c) in the virtual display 152. The third view 230c shows a first part 242 of the large circle 240.

In some implementations, the optimization of the graph is complete. The Z-Buffer 154 can include information about each pixel displayed in the virtual display 152 in the third view 230c, the object (circle or bubble) it corresponds to, and the order of rendering. The Z-order optimizer 150 can read the information and data in the Z-Buffer 154 and, based on the information, can determine that optimization is complete because the large circle 240 (the first part 242 part of the large circle 240) is included the third view 230c.

In some implementations, in addition or in the alternative, the Z-order optimizer 150 can determine that a predetermined number, n, of optimizations have not been performed (where n is equal to the number of objects in the graph). Based on this determination, the Z-order optimizer 150 can continuing performing any further optimizations (the Z-order optimizer 150 can continue to swap data points (data representations or objects).

The Z-Buffer 154 can include information about each pixel displayed in the virtual display 152 in the third view 230c, the object (circle or bubble) it corresponds to, and the order of rendering. The Z-order optimizer 150 can read the information and data in the Z-Buffer 154 and, based on the information, can swap two objects included in the rendered graph. For example, the Z-order optimizer 150 can swap the rendering of the second circle 252 and the large circle 240, rendering the smaller second circle 252 before the large circle 240. The Z-order optimizer 150 can render the reordered data as another graph rendering (e.g., a fourth view 230d) in the virtual display 152. The fourth view 230d shows the first part 242 and a second part 244 of the large circle 240.

The Z-Buffer 154 can include information about each pixel displayed in the virtual display 152 in the fourth view 230d, the object (circle or bubble) it corresponds to, and the order of rendering. The Z-order optimizer 150 can read the information and data in the Z-Buffer 154 and, based on the information, can swap two objects included in the rendered graph. For example, the Z-order optimizer 150 can swap the rendering of the third circle 254 and the large circle 240, rendering the smaller third circle 254 before the large circle 240. The Z-order optimizer 150 can render the reordered data as another graph rendering (e.g., a fifth view 230e) in the virtual display 152. The fifth view 230e shows the first part 242, the second part 244, and a third part 246 of the large circle 240.

The Z-Buffer 154 can include/store information about each pixel displayed in the virtual display 152 in the fifth view 230e, the object (circle or bubble) it corresponds to, and the order of rendering. The Z-order optimizer 150 can read the information and data in the Z-Buffer 154 and, based on the information, can swap two objects included in the rendered graph. For example, the Z-order optimizer 150 can swap the rendering of the fourth circle 256 and the large circle 240, rendering the smaller fourth circle 256 before the large circle 240. The Z-order optimizer 150 can render the reordered data as another graph rendering (e.g., a sixth view 230f) in the virtual display 152. The sixth view 230f shows the entire large circle 240.

The Z-order optimizer 150 can determine that n−1 optimizations have been performed (where n is equal to the number of objects in the graph). Based on this determination, the Z-order optimizer 150 can stop performing any further optimizations (the Z-order optimizer 150 will no longer swap data point (data representations or objects).

Optimization of the graph is complete. The Z-Buffer 154 can include information about each pixel displayed in the virtual display 152 in the sixth view 230f, the object (circle or bubble) it corresponds to, and the order of rendering. The Z-order optimizer 150 can read the information and data in the Z-Buffer 154 and, based on the information, can determine that optimization is complete because the entire large circle 240 is within view and is not covering or hiding any of the first circle 250, the second circle 252, the third circle 254, or the fourth circle 256.

The example charts shown in FIGS. 2A-C illustrate the use of bubble charts. In some implementations, the graphics primitive may not be a circle or bubble. Example graphics primitives can include, but are not limited to squares, rectangles, triangles, crosses, stars, single pixels, thumbnail images, images, clip-art, pictures, and any type of shape or mark. The graphics primitive can be used in any type of scatter plot where a shape representing a data point can occupy/fill at least one pixel of the available pixels used to draw/create the scatter plot.

Figure 3:
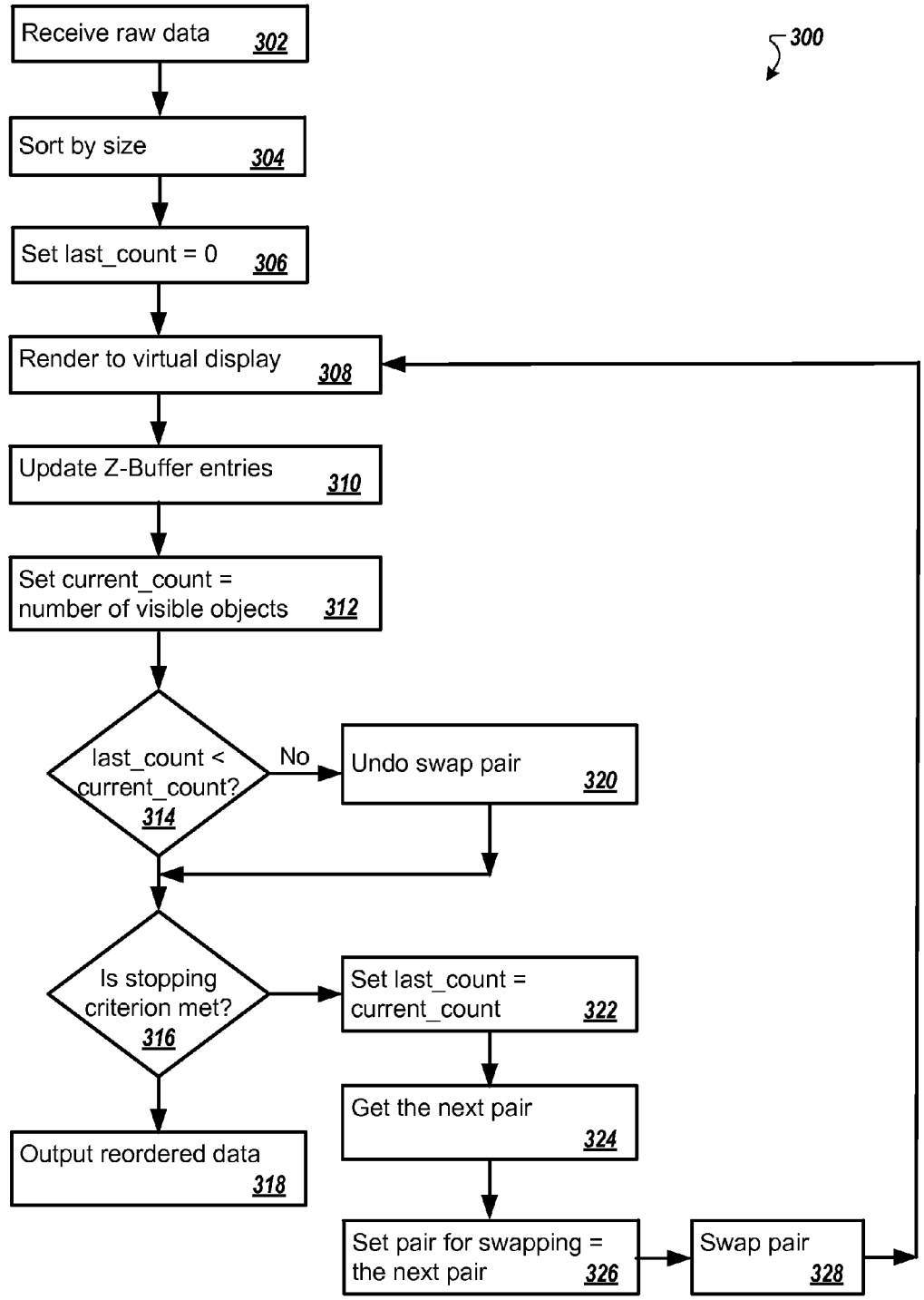
FIG. 3 is flowchart that illustrates a method for optimizing the display of data points in a graph.

FIG. 3 is a flowchart that illustrates a method 300 for optimizing the display of data points in a graph. In some implementations, the systems and computing devices described herein can implement the method 300. For example, the method 300 can be described referring to FIGS. 1A-B.

The method can start by receiving raw data for rendering in a chart or graph (block 302). As shown in FIG. 1B, the visualization preprocessing system 138 (and specifically the Z-order optimizer 150) can receive raw data 148 (e.g., one or more data records) from the database 142b. For example, the data records can include sales data for multiple products or items (e.g., a time of sale for an item, a price or cost for an item, and a number or amount of the item sold). Graphics primitives for rendering are sorted by a size associated with a graphics primitive (block 304). In addition, since this is the start of the rendering of the graphics primitives, a variable (last_count) can be set equal to zero (block 306). The variable, last_count, is set equal to a number of visible objects (graphics primitives) in the virtual display for a previously rendered virtual display of graphics primitives.

The graphics primitives are rendered to a virtual display (block 308). For example, the Z-order optimizer 150 can render the graphics primitives (e.g., bubbles or circles) to the virtual display 152. The entries in a Z-Buffer are updated (block 310). For example, based on the rendering of the graphics primitives on the virtual display 152, associated depth information for each pixel included in a graphics primitive can be updated in the Z-Buffer 154. In this case, since it is the first time for a rendering of graphics primitives, the entries in the Z-Buffer 154 can be created. A specific depth value for a pixel can be set or updated in the Z-Buffer 154 when it is determined that a graphics primitive (e.g., a bubble in a bubble graph) being rendered includes the specific pixel.

Set a variable, current_count, equal to a number of visible objects (graphics primitives) in the virtual display (block 312). For example, the number of visible objects can be the number of distinct objects referenced by a last Z-Buffer (e.g., the Z-Buffer 154) entry for each pixel. For example, referring to FIGS. 1A, 1B, and 2C, when rendering the second view 230b in the virtual display 152, the Z-order optimizer 150 can set a last_count equal to zero. A current_count is set equal to four as the first circle 250, the second circle 252, the third circle 254, and the fourth circle 256 are visible in the virtual display 152.

It is determined if the last_count (a number of visible objects (graphics primitives) rendered in a previous virtual display) is less than the current_count (a number of visible objects (graphics primitives) rendered in a current virtual display) (block 314). If the last_count is less than the current_count, the method proceeds to determine if one or more criteria for stopping the virtual rendering of the graphics primitives has been met (block 316). For example, if the number of visible objects (graphics primitives) rendered in a previous virtual display is less than the number of visible objects (graphics primitives) rendered in a current display, this can indicate that objects (graphics primitives) for rendering in the chart may all be visible to the user in the chart. It may also indicate that if the order of displaying of two objects (graphics primitives) was previously swapped, the swapping did not cause another graphics primitive(s) to be hidden or obscured by the swapping.

Next it is determined if criterion (or criteria) for stopping the swapping of the order of displaying of objects in the virtual display has been met (block 316). As described, the criterion (criteria) can be based on a determined data-efficiency measure for the current virtual display 152 of the graphics primitives based on information included in the Z-Buffer 154. In some cases, if the data-efficiency measure for a current graph is greater than ninety percent (e.g., ninety percent of all of the data points being plotted are not hidden or obscured from view), the method 300 will no longer swap data point (objects).

In a first case, if there is no improvement in the virtual display of the data objects (e.g., no additional data objects are uncovered) as indicated by the last_count being less than the current_count over the last $k_1$ number of iterations, the swapping of the order of display of the data objects can be stopped. In a second case, the swapping of the order of display of the data objects can be stopped after $k_2$ number of iterations, where $k_2$ may be determined experimentally. In a third case, the swapping of the order of display of the data objects can be stopped after $k_3$ milliseconds has expired, where $k_3$ may be determined experimentally. In a fourth case, the swapping of the order of display of the data objects can be stopped after consuming more than $k_4$ milliseconds of CPU time (e.g., the CPU 132 as shown in FIG. 1A, where $k_4$ may be determined experimentally. In some cases, the criteria for stopping the swapping of the order of the displaying of two objects in the virtual display can include one of more of the first case, second case, third case and fourth case.

If it is determined that the criterion (criteria) for stopping the swapping of the order of displaying of objects in the virtual display has been met (block 316), the reordered data can then be output (block 318). For example, referring to FIG. 1B, the visualization preprocessing system 138 can output reordered data 156 to the rendering system 140 for rendering on the display 104.

If it is determined that the last_count (a number of visible objects (graphics primitives) rendered in a previous virtual display) is not less than the current_count (a number of visible objects (graphics primitives) rendered in a current virtual display) (the last_count is equal to or greater than the current_count) (block 314), the method 300 proceeds to undo a previous swapping of the order of displaying two data objects (graphics primitives) in the virtual display (block 320). This can indicate that the previous swapping of the order of displaying two data objects (graphics primitives) in the virtual display caused one or more other data objects (graphics primitives) to be hidden or obscured because of the swapping.

The method 300 continues to determine, as described above, if the criterion (or criteria) for stopping the order of the displaying of two objects in the virtual display has been met (block 316). If it is determined that the criterion (criteria) for stopping the order of the displaying of two objects in the virtual display has not been met (block 316), the method 300 can continue to swap data objects to determine if there is a better, more preferred order of displaying the data objects that results in a minimum number (if any at all) of hidden or obscured objects. The last_count is set equal to the current_count (block 322). As described, these counts represent the number of visible objects (graphics primitives) rendered in a virtual display for a previous virtual display and a current virtual display, respectively.

The method 300 then selects the next two data objects (the next pair of data objects) for swapping and stores an identifier or reference for the pair of data objects (block 324). For example, referring to FIG. 1B, when determining a pair of data objects for swapping (two data objects to swap), the Z-order optimizer 150 can use an algorithm. In some implementations, the algorithm can select two data objects (a pair of data objects) at random. In some implementations, the algorithm can select two data objects (a pair of data objects) based on a heuristic measure associated with each data object. For example, the values of a heuristic measure can be derived values, based on the values of the two data objects of the swap pair.

The pair for swapping (the designated two data objects) is set to the selected next pair of objects (block 326). The designated two data objects (a pair of data objects) are swapped (block 328). The method then continues to render the reordered data objects in a virtual display (block 308).

Figure 4:
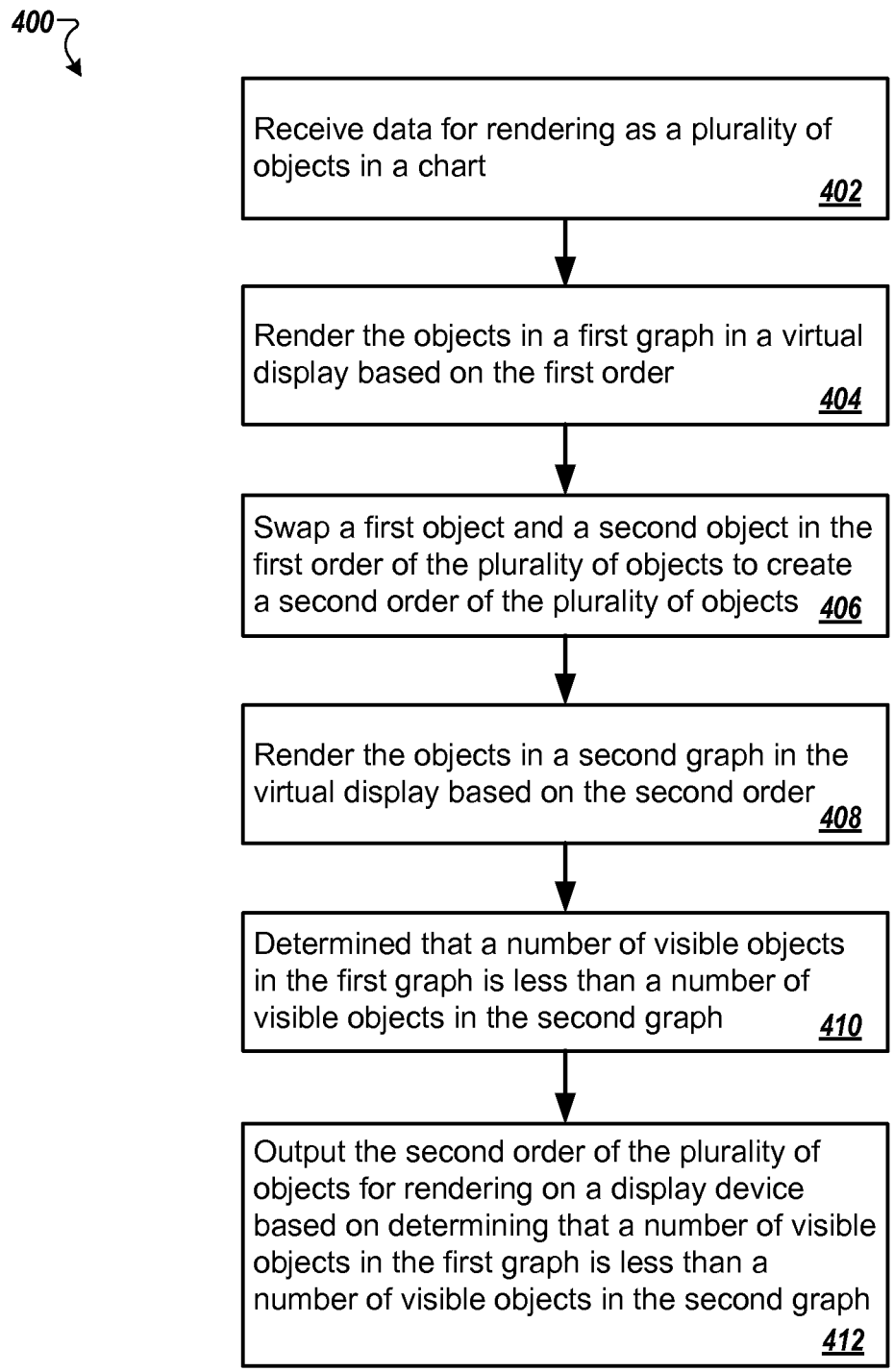
FIG. 4 is a flowchart that illustrates a method of plotting and displaying graphics primitives on a graph.

FIG. 4 is a flowchart that illustrates a method 400 of plotting and displaying graphics primitives on a graph. In some implementations, the systems and computing devices described herein can implement the method 400. For example, the method 400 can be described referring to FIGS. 1A-B.

Data for rendering as a plurality of objects in a chart is received by a computing system (block 402). The objects in a first graph are rendered in a virtual display based on a first order (block 404). In some implementations, the objects can be sorted by the computing system into a first order based on a size associated with each of the plurality of objects. A first object and a second object in the first order of the plurality of objects are swapped to create a second order of the plurality of objects (block 406). The objects are rendered in a second graph in the virtual display based on the second order (block 408). It is determined that a number of visible objects in the first graph is less than a number of visible objects in the second graph (block 410). The second order of the plurality of objects for rendering on a display device is output based on determining that a number of visible objects in the first graph is less than a number of visible objects in the second graph (block 412).

The method 400 can be performed until beneficial results are achieved. In some implementations, the method 400 can be performed (e.g., multiple different pairs of data objects can be swapped) until it is determined that all of the rendered data objects are visible. In some implementations, the method 400 can be performed (e.g., multiple different pairs of data objects can be swapped) until it is determined that a maximum number of rendered data objects are visible. For example, the maximum number of data objects may be a predetermined number of data objects. In another example, even though the maximum number of data objects may be less that the total number of data objects, it may be the maximum number of data objects that can be rendered as visible data objects.

In some implementations, after swapping (switching) two data objects (a pair of data objects), the re-rendering of all of the data objects may influence the visibility of other data objects (data objects that are not the pair of data objects). The re-rendered data objects may include fewer visible data objects as compared to the rendered data objects before the swapping of the pair of data objects. In these cases, the swapping of the pair of data objects can be undone.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory, machine-readable medium having instructions stored thereon, the instructions, when executed by a processor, cause a computing device to:
   receive data points for rendering as a plurality of three-dimensional (3D) objects in a chart, each 3D object being placed at an x-y coordinate in two-dimensions and being of a size in a third-dimension, the x-y coordinate and the size for each 3D object being based on a data record associated with the respective 3D object;
   swap an order for rendering the plurality of 3D objects in a graph in a virtual display a predetermined number of iterations, the swapping resulting in multiple rendered 3D object orders;
   for each rendered 3D object order, identify a data-efficiency measure associated with the rendered 3D object order, the data-efficiency measure identifying a number of obscured data points for each rendered 3D object order;
   identify a rendered 3D object order associated with a highest data-efficiency measure from the multiple rendered 3D object orders, the identified rendered 3D object order minimizing the number of obscured data points; and
   output, to a display device, the plurality of 3D objects for rendering on the display device in the identified rendered 3D object order associated with the highest data-efficiency measure, the rendering creating the chart for viewing on the display device.

2. The medium of claim 1,
   wherein each of the 3D objects are circles,
   wherein the third dimension is a size of the circle, and
   wherein the graph is a bubble graph.

3. The medium of claim 1, wherein the each of the 3D objects are shapes that include at least one pixel of a number of pixels available for rendering the plurality of objects.

4. The medium of claim 1, the instructions further causing the computing device to:
   sort the 3D objects into a first order based on the size of each of the plurality of 3D objects.

5. The medium of claim 4, wherein sorting the 3D objects into the first order comprises sorting the 3D objects into an order from a smallest size object to a largest size 3D object.

6. The medium of claim 1, the instructions further causing the computing device to:
   update entries in a Z-Buffer, each entry associated with a respective each of the plurality of 3D objects, the updating being after a rendering of the 3D objects in the graph.

7. The medium of claim 6, the instructions further causing the computing device to:
   display a plurality of pixels in the virtual display; and
   store, in the Z-Buffer, information about each pixel displayed in the virtual display.

8. The medium of claim 7, wherein the information about each pixel displayed in the virtual display and stored in the Z-Buffer includes an indication of the 3D object associated with the pixel, and an order for rendering the 3D object corresponding to the pixel.

9. The medium of claim 1, wherein outputting the plurality of 3D objects for rendering on the display device in the identified rendered 3D object order associated with the highest data-efficiency measure is based on determining that at least one criterion has been satisfied.

10. The medium of claim 9, wherein the at least one criterion is determining that a predetermined time period has expired.

11. The medium of claim 1, wherein the instructions that cause the computing device to identify a rendered 3D object order associated with the highest data-efficiency measure from the multiple rendered 3D object orders further includes instructions to:
   restore a first order of the 3D objects based on determining that a number of visible 3D objects in a first graph is equal to or greater than a number of visible 3D objects in a second graph.

12. The medium of claim 1, wherein the instructions that cause the computing device to identify a rendered 3D object order associated with the highest data-efficiency measure from the multiple rendered 3D object orders further includes instructions to:
   swap a third object and a fourth object in a second order of the plurality of 3D objects creating a third order of the plurality of 3D objects based on determining that at least one criterion has not been satisfied.

13. A computer system comprising:
a visualization preprocessing system configured to receive data points for rendering as a plurality of three-dimensional (3D) objects in a chart, each 3D object being placed at an x-y coordinate in two-dimensions and being of a size in a third-dimension, the x-y coordinate and the size for each 3D object being based on a data record associated with the respective 3D object, the visualization preprocessing system including:
a virtual display;
a Z-order optimizer configured to swap an order for rendering the plurality of 3D objects in a graph in the virtual display a predetermined number of iterations; and
an optimizer rendering system configured to:
for each rendered 3D object order, identify a data-efficiency measure associated with the rendered 3D object order, the data-efficiency measure identifying a number of obscured data points for each rendered 3D object order; and
identify a rendered 3D object order that results in a highest data-efficiency measure, the identified rendered 3D object order minimizing the number of obscured data points; and
a rendering system configured to:
receive, from the visualization preprocessing system, the plurality of 3D objects in the rendered 3D object order identified as having the highest data-efficiency measure, and
output, to a display device, the plurality of 3D objects for rendering on the display device in the rendered 3D object order identified as having the highest data-efficiency measure, the rendering creating the chart for viewing on the display device.

14. The system of claim 13, wherein the Z-order optimizer is further configured to sort the plurality of 3D objects into a first order based on the size of each of the plurality of 3D objects.

15. The system of claim 13, further comprising:
a Z-Buffer including a plurality of entries, each entry associated with a respective pixel included in the virtual display, each entry including an indication of the 3D object associated with the pixel and an order for rendering the 3D object corresponding to the pixel.

16. The system of claim 15, wherein the Z-order optimizer is further configured to update entries in the Z-Buffer subsequent to the rendering of the plurality of 3D objects in the graph in the virtual display in a specific order.

17. The system of claim 13,
wherein each of the 3D objects are circles,
wherein the third dimension is a size of the circle, and
wherein the graph is a bubble graph.

18. A method comprising:
receiving, by a computing system, data points for rendering as a plurality of three-dimensional (3D) objects in a chart, each 3D object being placed at an x-y coordinate in two-dimensions and being of a size in a third-dimension, the x-y coordinate and the size for each 3D object being based on a data record associated with the respective 3D object;
swapping an order for rendering, by the computing system, the plurality of 3D objects in a graph in a virtual display a predetermined number of iterations, the swapping resulting in multiple rendered 3D object orders;
identifying, for each rendered 3D object order, a data-efficiency measure associated with the rendered 3D object order, the data-efficiency measure identifying a number of obscured data points for each rendered 3D object order;
identifying a rendered 3D object order associated with a highest data-efficiency measure from the multiple rendered 3D object orders, the identified rendered 3D object order minimizing the number of obscured data points; and
outputting, to a display device, the plurality of 3D objects for rendering on the display device in the identified rendered 3D object order associated with the highest data-efficiency measure, the rendering creating the chart for viewing on the display device.

19. The method of claim 18, further comprising:
updating entries in a Z-Buffer, each entry associated with a respective each of the plurality of 3D objects, the updating being after the rendering of the 3D objects in the graph;
displaying a plurality of pixels in the virtual display; and
storing, in the Z-Buffer, information about each pixel displayed in the virtual display.

20. The method of claim 19,
wherein each of the 3D objects are circles,
wherein the third dimension is a size of the circle, and
wherein the graph is a bubble graph.

* * * * *